(12) United States Patent
Huchard et al.

(10) Patent No.: US 7,055,917 B2
(45) Date of Patent: Jun. 6, 2006

(54) METHOD AND DEVICE FOR DETERMINING A FORCE EXERCISED BY THE GROUND ON A WHEEL

(75) Inventors: Xavier Huchard, Domicile (FR); Jean-Yves Lenoir, Domicile (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/045,945

(22) Filed: Jan. 28, 2005

(65) Prior Publication Data

US 2005/0212356 A1    Sep. 29, 2005

Related U.S. Application Data

(63) Continuation of application No. PCT/FR03/02404, filed on Jul. 30, 2003.

(30) Foreign Application Priority Data

Jul. 31, 2002 (FR) .................... 02 09718

(51) Int. Cl.
*B60T 8/62* (2006.01)

(52) U.S. Cl. .................. 303/188; 701/70; 303/146; 303/150; 303/112

(58) Field of Classification Search ............... 303/188, 303/146, 150, 139, 140, 112; 701/70, 71
See application file for complete search history.

(56) References Cited

U.S. PATENT DOCUMENTS

| | | | |
|---|---|---|---|
| 4,160,378 A | 7/1979 | Himmler | 73/146 |
| 5,101,922 A | 4/1992 | Ohmura | |
| 5,376,868 A | 12/1994 | Toyoda et al. | 318/587 |
| 5,377,562 A | 1/1995 | Kitagawa et al. | |
| 5,668,724 A | 9/1997 | Ehret et al. | |
| 5,702,165 A | 12/1997 | Koibuchi | 303/146 |
| 5,821,434 A | 10/1998 | Halliday | 73/862.541 |
| 5,913,576 A | 6/1999 | Naito et al. | |
| 6,021,365 A | 2/2000 | Ishii et al. | |
| 6,161,431 A | 12/2000 | Drähne et al. | 73/146 |
| 6,300,937 B1 | 10/2001 | Rosenberg | |
| 6,324,458 B1 | 11/2001 | Takagi et al. | |
| 6,338,270 B1 | 1/2002 | Mancosu et al. | 73/146 |
| 6,616,250 B1 * | 9/2003 | Fennel et al. | 303/139 |
| 6,659,570 B1 * | 12/2003 | Nakamura | 303/146 |

(Continued)

FOREIGN PATENT DOCUMENTS

DE    42 08 014 A1    2/1993

(Continued)

*Primary Examiner*—Melanie Torres
(74) *Attorney, Agent, or Firm*—Fitzpatrick, Cella, Harper & Scinto (57) ABSTRACT

A device and method are provided for determining a longitudinal force (Fx) exerted on a wheel of a motor vehicle by a ground surface supporting the wheel, the vehicle including connections means which connect the wheel to a body of the vehicle. An actual force (FAX) is measured at the level of at least one measurement point in the connection means. A force (FDx, Fx) is calculated which results from a transmission via the connection means from the at least one measurement point to the wheel, of a body-associated force (FADX, FAX), which depends at least on the actual force. The longitudinal force (Fx) exerted on the wheel by the ground surface is calculated as a function at least of the force (FDx; Fx) resulting from the transmission of the body-associated force.

21 Claims, 4 Drawing Sheets

U.S. PATENT DOCUMENTS

| | | | |
|---|---|---|---|
| 6,766,239 B1 * | 7/2004 | Barron et al. | 701/71 |
| 2002/0059822 A1 | 5/2002 | Miyazaki | 73/118.1 |
| 2003/0094039 A1 | 5/2003 | Poulbot | 73/146 |
| 2005/0012501 A1 | 1/2005 | Isono et al. | 324/300 |

FOREIGN PATENT DOCUMENTS

| | | |
|---|---|---|
| JP | 07-245806 | 9/1995 |
| JP | 2000-071956 | 3/2000 |

* cited by examiner

METHOD AND DEVICE FOR DETERMINING A FORCE EXERCISED BY THE GROUND ON A WHEEL

CROSS-REFERENCE TO RELATED APPLICATIONS

This application claims benefit of French Patent Application No. 02/09718, filed Jul. 31, 2002, and and is a continuation of Patent Cooperation Treaty International Application No. PCT/FR2003/002404, filed Jul. 30, 2003, both of which are incorporated herein by reference in their entirety.

BACKGROUND OF THE INVENTION

1. Field of the Invention

The present invention concerns a method and device for determining a force exerted on a wheel of a motor vehicle by a ground surface supporting the wheel, along a longitudinal direction of the wheel.

2. Description of Related Art

On-board electronic systems are known, which are designed to assist the driver of a vehicle when he is in various types of difficult situations. The best known are without doubt the ABS anti-blocking systems and the ESP electronic regulation system for the dynamic behaviour of the vehicle.

An ABS system acts on the braking system to prevent blocking of the wheels during emergency braking. An ESP system also acts on the braking system, and if necessary on the engine control system, so as to improve a vehicle's path in a situation of dangerous cornering, for example when a tight curve has been entered at too high a speed, i.e. to counteract any tendency of the vehicle to oversteer or understeer.

A common point of such systems is to aim to reinforce the road-holding of a motor vehicle, more precisely to seek to adapt the handling of the vehicle so that the longitudinal and/or lateral acceleration required does not exceed the amount of force which the road or surface on which the vehicle is moving can effectively transmit to the vehicle via its tires. This can be done on the one hand by adapting the amount of force and on the other hand by adapting the handling parameters, such as the braking force, the running of the engine or the steering angle of the wheels.

Thus, an ABS system controls the braking force applied to the wheel to maintain the longitudinal force exerted by the road on the tire at a maximum allowable level. In a known way, this control is based on a measurement of the sliding speed Vg of the tire, defined for example by: $Vg=|R\omega-Ve|$ where $\omega$ denotes the wheel rotation speed, R the outer radius of the wheel and Ve the overall speed of the vehicle.

Figure 5:
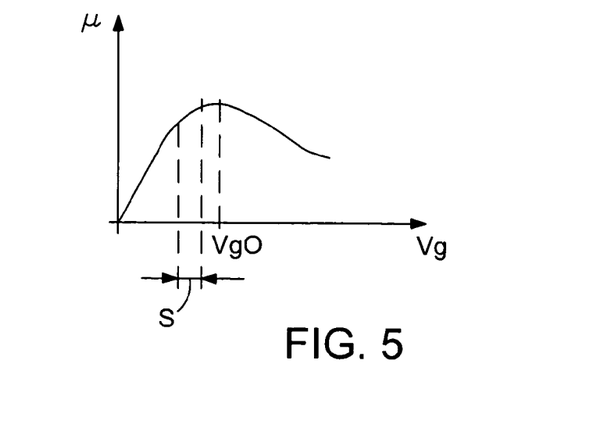
FIG. 5: Diagram showing the variation of the friction coefficient $\mu$ between a vehicle wheel and a road, as a function of the sliding speed Vg of the wheel

FIG. 5 shows the variation of the coefficient of friction $\mu$ between the tire and the road as a function of the sliding speed Vg. The figure shows that there is an optimum sliding speed $Vg_0$ for which the coefficient of friction $\mu$ is maximum. If the load supported by the wheel is taken as constant, that optimum sliding speed $Vg_0$ also maximises the force of the road on the tire, which is proportional to the coefficient of friction $\mu$.

If, during braking with the aid of a working brake, the sliding speed Vg of the wheel exceeds $Vg_0$, the force exerted by the road on the wheel starts decreasing, causing the vehicle's deceleration to tend to decrease while the deceleration of the wheel tends to increase. This is because during braking, the longitudinal contact force between the ground and the wheel is both a force that decelerates the vehicle and a force driving the wheel which is opposed to the braking force applied by the working brake. The result of these two tendencies is that the sliding speed increases, which in turn accentuates the reduction of the friction coefficient. Under these conditions, unless the braking force applied to the wheel is relaxed completely, it can be seen that the wheel will rapidly tend towards complete blockage, which in fact is a situation of stable equilibrium for the wheel. Thus, to achieve the shortest possible braking, the braking force should be as large as possible without the sliding speed Vg exceeding $Vg_0$.

Consequently, as a safety measure ABS systems are classically adjusted to operate in a sliding speed range S located substantially below $Vg_0$, as shown in FIG. 5, so as to avoid the critical zone $Vg>Vg_0$. Although it might seem theoretically possible to extend the range of operation of the system up to $Vg=Vg_0$, this cannot be done in practice because of the variability of $Vg_0$ and errors in the measurement of Vg. Thus, the known ABS systems lead to a force exerted on the wheel by the ground which is below its optimum value.

To overcome this disadvantage, it would be desirable to base a braking force control algorithm, for example for an ABS system, not on the value of the sliding speed but directly on the value of the force exerted by the ground on the wheel, which presupposes that this value is known.

SUMMARY OF THE INVENTION

The present invention aims to provide a method and device which enable a precise determination of the force exerted on a wheel, in particular a driving wheel, by a ground surface supporting the wheel, along a longitudinal direction of the wheel, from measurements carried out in the suspension system.

For this, the invention provides a method for determining a longitudinal force exerted on a wheel of a motor vehicle by a ground surface supporting the wheel, the vehicle comprising means which connect the wheel to a body of the vehicle, characterised in that the method comprises stages consisting in:

measuring an actual force at the level of at least one measurement point in the connecting means, calculating a force that results from a transmission, via the connection means from the at least one measurement point to the wheel, of a body-associated force that depends at least on the actual force, calculating the longitudinal force exerted on the wheel by the ground surface as a function at least of the force resulting from a transmission.

In this method the body-associated force can be a driving force, in particular when no braking is applied to the wheel, or a force of resistance, in particular when no drive torque is applied to the wheel or the drive torque is measured separately and its contribution is subtracted from the measured actual force. In this way a longitudinal component of the force exerted on the wheel by the ground force is determined, this longitudinal component being parallel to the intersection of a median plane of the wheel with the ground.

Preferably, the force resulting from transmission is calculated as a function of at least one parameter chosen from among a steering angle of the wheel, a vertical distance of the wheel relative to the body, the condition of activity of a braking system coupled to the wheel, and a driving torque applied to the wheel by an engine of the vehicle.

According to a particular embodiment, a stage is envisaged in which a steering angle of the wheel is measured, and the force resulting from transmission is calculated as a function of this steering angle.

In another particular embodiment, a stage is envisaged in which a vertical distance of the wheel relative to the body is measured, and the force resulting from transmission is calculated as a function of this vertical distance.

Advantageously, a stage is envisaged in which the activity condition of a braking system coupled to the wheel is detected, and the force resulting from transmission is calculated as a function of this activity condition. For example, a first transfer function, adapted to model the transmission of a driving-type, body-associated force, is chosen when the braking system is inactive, and a second transfer function, adapted to model the transmission of a resistance-type, body-associated force, is chosen when the braking system is active.

Advantageously, the force resulting from transmission is calculated by applying to the body-associated force a transfer function that is representative of the connection means. In a particular embodiment this transfer function is applied by means of at least one neuronal network.

Preferably, the wheel is a driving wheel and the method comprises a stage in which a drive torque applied to the wheel by an engine of the vehicle is measured, the force resulting from transmission being calculated as a function of the drive torque.

According to a particular embodiment of the invention, the body-associated force consists of the actual force. Preferably, in this case the longitudinal force exerted on the wheel is calculated equal to the force resulting from the transmission of the actual force via the connection means. This makes for a particularly simple process which enables a precise determination of the force exerted on the wheel in the most common vehicle driving situations.

In another embodiment, the method according to the invention comprises a stage in which a virtual, wheel-associated driving force is calculated, which represents a reaction of the ground surface to the driving torque, the body-associated force also depending on the virtual, wheel-associated driving force, the force being calculated as a virtual, wheel-associated resistance force, the longitudinal force exerted on the wheel by the ground surface being calculated as a function of the virtual, wheel-associated driving force and of the virtual, wheel-associated resistance force.

The method is based on a decomposition of the longitudinal force into two virtual components. In effect, at any moment the wheel can be regarded as experiencing two simultaneous forces in its ground contact area: a virtual driving force, corresponding to the action of the transmission on the wheel—that action being in fact able to be a driving action (acceleration) or a resistance action (engine braking) relative to the vehicle's effective displacement—and a virtual resistance force, corresponding to resistance effects such as the rolling resistance of the tire and the effect of the vehicle's braking system. These two virtual components combine in the form of the actual longitudinal force transmitted by the contact area, whose determination is sought. However, to each of these components there corresponds a specific distribution of forces in the elements of the suspension system that connect the wheel to the body. For example, the elements of the suspension arms, the elastic joints, the springs, the shock absorbers and the vehicle's steering system. The fact of decomposing the actual longitudinal force into two virtual components makes it possible to take account of these different distributions and so to determine the actual force with precision from one or more force measurements in the suspension system. The first component (virtual driving force) is calculated from the instantaneous value of the torque transmitted to the wheel by an engine shaft. The second component (virtual resistance force) is determined from at least one actual force measured in the suspension system and from the distribution of forces as a function of their origins.

The virtual, wheel-associated driving force represents a reaction of the ground surface to the drive torque applied to the wheel but does not represent at least one resistance influence exerted on the wheel, for example a resistance force exerted by the braking system and/or a rolling resistance of the tire at the level of the contact area, the resistance influence(s) being represented by the virtual resistance force. Advantageously, the virtual, wheel-associated driving force is calculated as a force exerted by the ground surface on the wheel in reaction to the totality of the drive torque.

Advantageously, the calculation of the body-associated force comprises the following stages:

calculation of a virtual, body-associated driving force which would result from a transmission of the virtual, wheel-associated driving force from the wheel to the at least one measurement point via the connection means, calculation of the body-associated force as a virtual body-associated resistance force as a function of the virtual body-associated driving force, the virtual body-associated resistance force being applied at the level of the at least one measurement point.

Preferably, the method according to the invention comprises a stage in which a steering angle of the wheel is measured, the virtual body-associated driving force and/or the virtual wheel-associated resistance force being calculated as a function of this steering angle.

Preferably, the method according to the invention comprises a stage in which a virtual distance of the wheel relative to the body is measured, the virtual body-associated driving force and/or the virtual wheel-associated resistance force being calculated as a function of this vertical angle.

These measurement stages make it possible to take account of the actual position of the wheel relative to the body and of the corresponding configuration of the connection means, which improves the realism of the modelling of the transmission of forces via the connection means.

Advantageously, the virtual body-associated driving force can be calculated by applying to the virtual, wheel-associated driving force a first transfer function representative of the connection means. Likewise, the virtual, wheel-associated resistance force can be calculated by applying to the virtual, body-associated resistance force a second transfer function representative of the connection means.

Preferably, the first function and/or the second function is/are applied by means of at least one neuronal network.

The use of a neuronal network subjected to prior teach-in enables the transmission of the forces via the connection means to be modelled very precisely and realistically, in a semi-phenomenological way, in particular so as to take account of the non-linearity of the transmission and of resonance phenomena. Preferably, a first neuronal network is used for applying the first function and a second neuronal network for applying the second function.

Force measurement can take place at various measurement points in the suspension system, in particular at the level of joints between the connection elements. Of course, the modelling of force transmission between each measurement point and the wheel must take into account the position of the measurement point in the connection elements. Advantageously, the at least one measurement point comprises a connection point between the connection means and the body, and the actual force measured is a force exerted on the body at the level of the connection point.

In a particular embodiment of the invention, the connection means comprise a hub support on which the wheel is mounted, a suspension triangle or arm connected to the hub support, and at least one elastic joint comprising two mountings connected by an elastic body, a first of the mountings being fixed to the suspension triangle and a second of the mountings being fixed to the body and constituting the at least one point of connection to the body.

Advantageously, the actual force is measured by determining a deformation of the elastic body.

Preferably the actual force is measured parallel to the longitudinal direction of the vehicle.

The invention also provides a device for determining a longitudinal force exerted on a motor vehicle wheel by a ground surface supporting the wheel, the vehicle comprising connection means that connect the wheel to a body of the vehicle, characterised in that the device comprises:

means for measuring an actual force at the level of at least one measurement point in the connection means, means for calculating a force that results from transmission via the connection means, from the at least one measurement point to the wheel, of a body-associated force that depends at least on the actual force, means for calculating the longitudinal force exerted on the wheel by the ground surface as a function at least of the force resulting from transmission.

In a particular embodiment, means are provided for measuring a steering angle of the wheel, and the force resulting from transmission is calculated as a function of this steering angle.

In another particular embodiment, means are provided for measuring a vertical distance of the wheel relative to the body, and the force resulting from transmission is calculated as a function of this vertical distance.

In another particular embodiment, means are provided for detecting the activity condition of a braking system coupled to the wheel, and the force resulting from transmission is calculated as a function of this activity condition.

In yet another particular embodiment, means are provided for measuring a drive torque applied to the wheel by an engine of the vehicle, and the force resulting from transmission is calculated as a function of this drive torque.

Advantageously, the device according to the invention comprises:

means for calculating a virtual, wheel-associated driving force representing a reaction of the ground surface to the drive torque, means for calculating a virtual, body-associated driving force that would result from a transmission of the virtual, wheel-associated driving force from the wheel to the at last one measurement point via the connection means, means for calculating the body-associated force as a virtual, body-associated resistance force as a function of the actual force and of the virtual, body-associated driving force, this virtual body-associated resistance force being applied at the level of the at least one measurement point, the force resulting from the transmission of the body-associated force being calculated as a virtual, wheel-associated resistance force, the longitudinal force exerted on the wheel by the ground surface being calculated as a function of the virtual, wheel-associated driving force and of the virtual, wheel-associated resistance force.

Preferably, the means for calculating the virtual, body-associated driving force comprise a first neuronal network.

Preferably, the means for calculating the virtual, wheel-associated resistance force comprise a second neuronal network.

BRIEF DESCRIPTION OF THE DRAWINGS

The invention will be better understood, and others of its aims, characteristic details and advantages will emerge more clearly from the description of several particular embodiments of the invention, presented below solely for illustrative and not restrictive purposes, with reference to the attached drawing which shows.

DETAILED DESCRIPTION OF THE PREFERRED EMBODIMENTS

Figure 1:
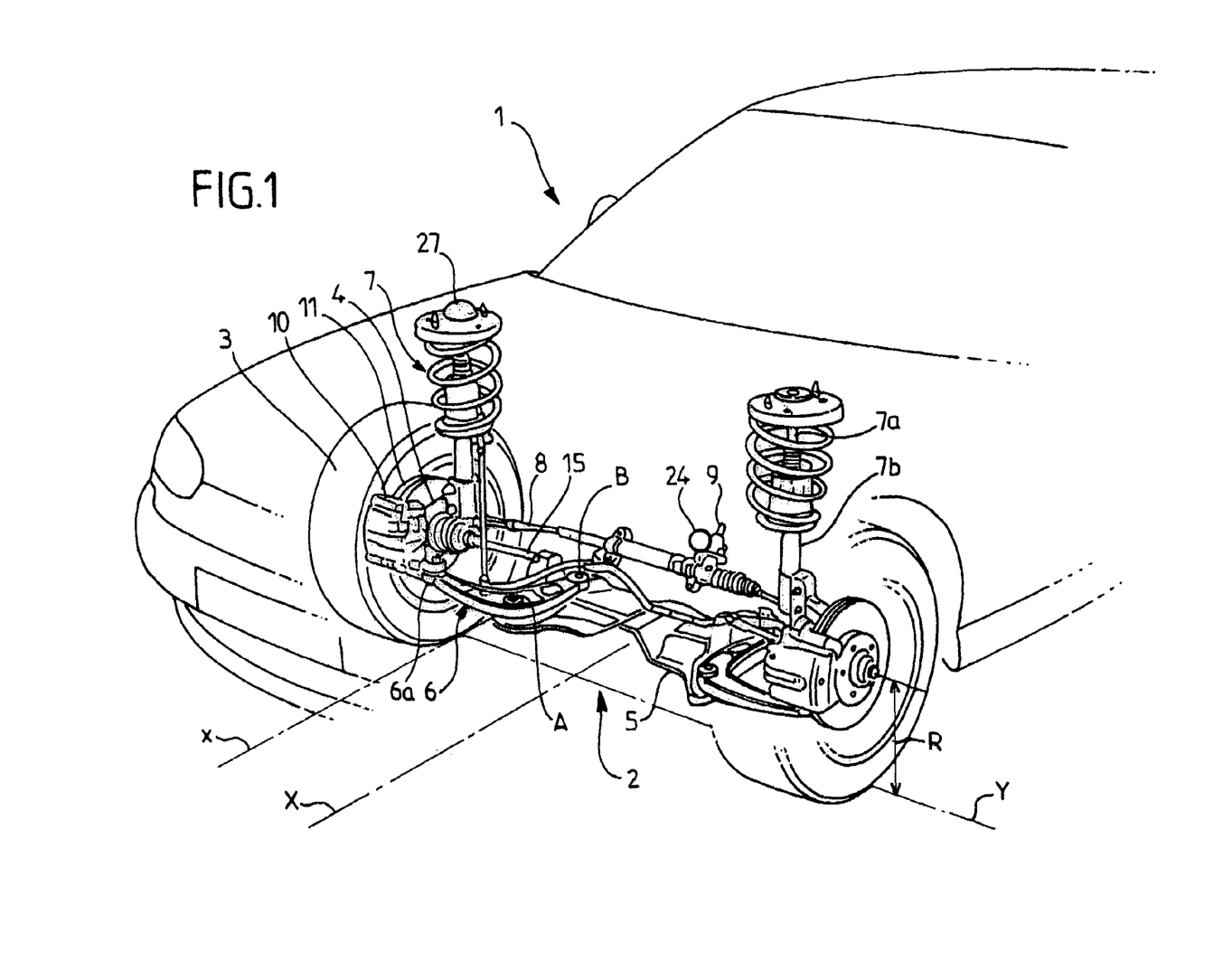
FIG. 1: Partially exposed perspective view of a motor vehicle designed for the implementation of a force determination method according to the invention

FIG. 1 shows the front end of a traction motor vehicle 1. The front axle 2 of the vehicle 1 is more particularly illustrated, with other parts of the vehicle 1 outlined with broken lines. In describing the constitution of the front axle 2, only half of it will be described since the front axle 2 is essentially symmetrical.

Each front wheel 3 is mounted to pivot on a hub support 4 held on the body 5 of the vehicle 1 by a suspension wishbone 6 and by a force strut 7. The body 5 denotes the suspended part of the vehicle 1. In the classical manner, the force strut 7 has two parts 7a, 7b that can move relative to on another, the bottom end of the lower part 7b being fixed to the hub support 4 while the top end of the upper part 7a is fixed to the body. A transmission shaft 15 is connected to the wheel 3 so as to transmit to it a drive torque F from an engine (not shown) of the vehicle 1.

A track rod 8 connects the hub support 4 to a steering column 9 of the vehicle 1 to modify the orientation of the wheel 3. The steering pivoting of the wheel 3 and the hub support 4 takes place about one end 6a of the suspension wishbone 6. The orientation of the wheel 3 is determined by a steering angle $\alpha$ defined classically as the angle between the longitudinal direction of the vehicle 1, represented by its axis X, and the longitudinal direction of the median plane of the wheel 3, represented by the axis x. In FIG. 1 the wheels are orientated so as to run in a straight line, so the angle $\alpha$ is negligible.

The hub support 4 also has a brake calliper 10 which can close a brake disk 11 attached to the wheel 3 so as to brake the rotation of the latter. The brake calliper 10 is part of a classical working brake and is controlled in a known way by hydraulic or electrical means (not shown).

Figures 2, 3:
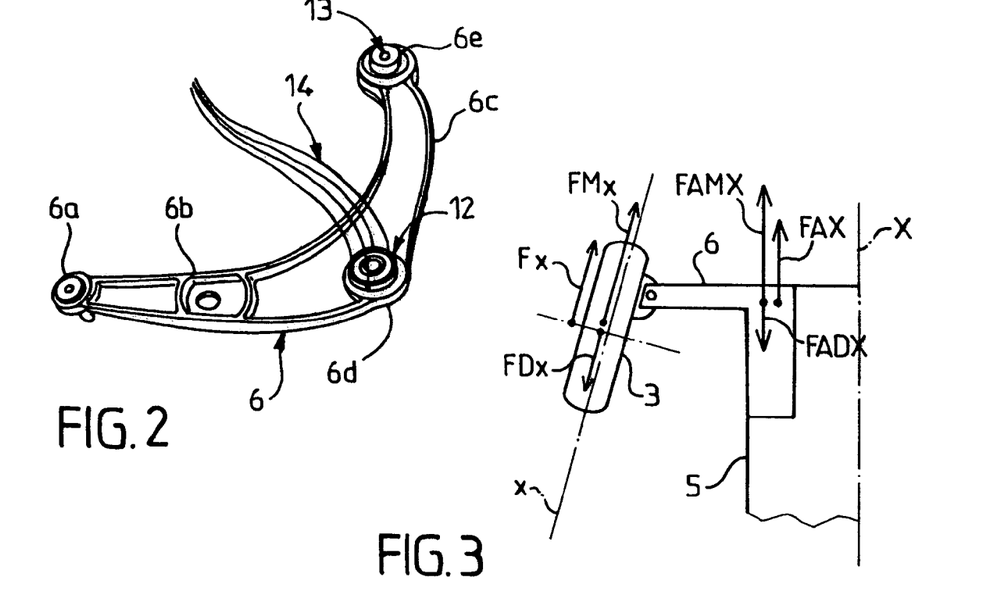
FIG. 2: Suspension wishbone of the vehicle in FIG., 1, fitted with a force measurement device
FIG. 3: Schematic representation of the forces taken into account in the method of FIG. 4

In this example the suspension wishbone 6 has two substantially perpendicular branches 6b and 6c, which can be seen better in FIG. 2. The suspension wishbone 6 is connected to the body 5 at two connection points A and B by means of two vibration-damping joints 12 and 13, for example joints of the elastic or hydroelastic type. The vibration-damping joint 12 comprises an external mounting 12a attached rigidly in a cylindrical seat located essentially at the mid-point 6d of the suspension wishbone 6, and an internal mounting 12b that forms the connection point A fixed to the body 5 by means of a bolt (not shown) which is engaged in its inside space. The vibration-damping joint 13 is fixed respectively to the other end 6e of the suspension wishbone 6 and to the body 5 in a manner similar to the joint 12. The joint 12 is provided with a measurement system 14 sensitive to the forces transmitted.

Figure 4:
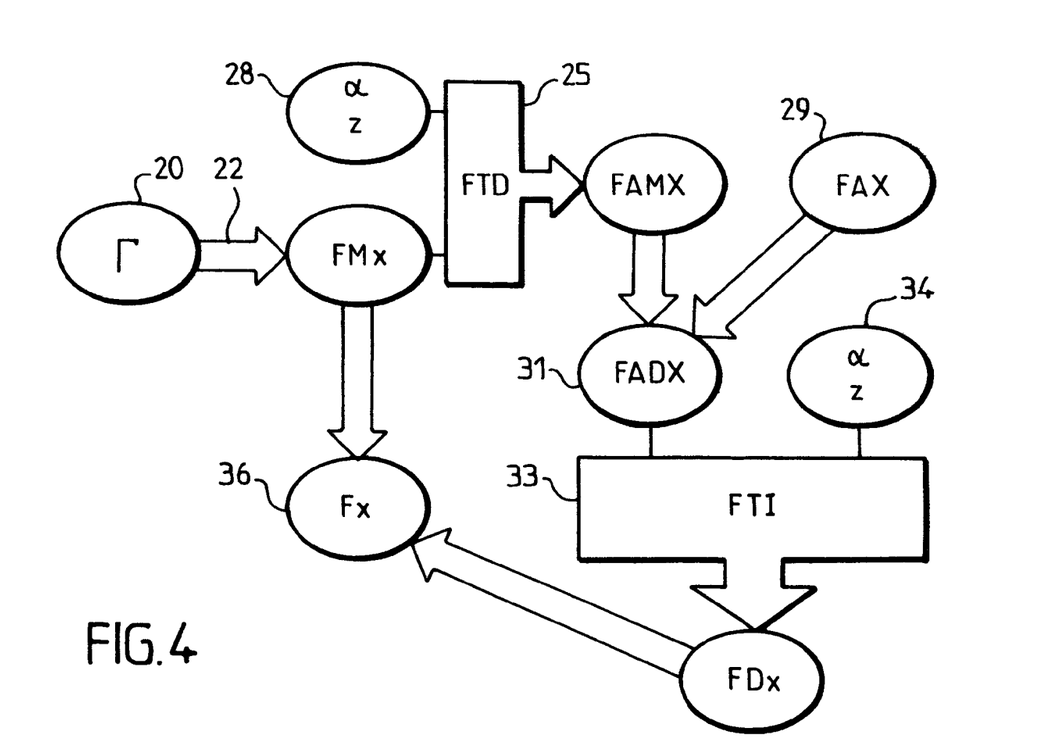
FIG. 4: Flow chart representing the method implemented by the vehicle of FIG. 1
Figure 6:
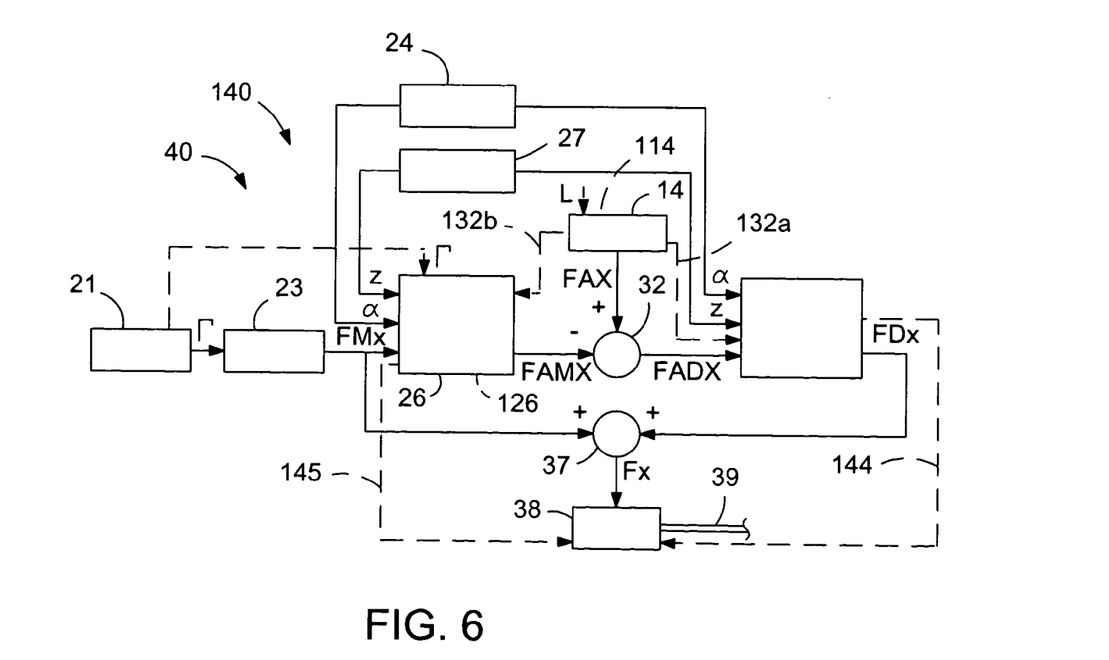
FIG. 6: Schematic, functional block representation of a force determination device according to the invention, installed in the vehicle of FIG. 1

With reference to FIG. 4, a first embodiment of an algorithm for determining the force Fx exerted by the ground on the wheel 3 in the longitudinal direction x of the wheel will now be described. Conjointly, with reference to FIG. 6, an electronic device 40 installed on-board the vehicle 1 for implementing that algorithm will also be described. The electronic device 40 is not fully represented in FIG. 1 for the sake of clarity. The stages of FIG. 4 and the components of FIG. 6 represented by broken lines do not relate to the first embodiment.

In stage 20, the drive torque Γ applied to the wheel 3 via the transmission shaft 15 is measured. The drive torque Γ can be in either direction, depending on whether the vehicle is in an acceleration phase or a phase of engine braking. In other words, the drive torque Γ is the torque received by the wheel 3 from the engine of the vehicle, that torque being in fact able to have a propulsion effect on the vehicle 1 or, on the contrary, a braking effect. The stage 20 can be implemented by a torque-measuring detector 21 which cooperates with the transmission shaft 15 to measure the algebraic value of the drive torque Γ. In a manner known as such, the drive torque can also be measured by a specific electronic computer of the engine.

In stage 22 a physical model is used to calculate a virtual driving force FMx received by the wheel 3 from the ground in reaction to the drive torque Γ. For this virtual driving force FMx calculation, the physical model used consists in that the ground reacts to the whole of the drive torque Γ on the wheel, i.e.:

$$FMx = \Gamma/R,$$

where R is the radius of the wheel 3. The force FMx so calculated is a virtual force in the sense that it only represents the effect of the drive torque Γ.

Stage 22 is implemented by a calculation module 23 from the value of the drive torque Γ furnished by the detector 21.

In stage 25, from the force FMx a virtual driving force FAMX is calculated, which would result from transmission of the force FMx to the connection point A of the body 5 via the hub support 4, the suspension wishbone 6 and the joint 12. The force FAMX is orientated along the longitudinal direction X of the vehicle 1. This calculation is done with the aid of a first function FTD representative of the mechanical properties of the connection means connecting the wheel 3 to the body 5. The function FTD is modelled in a realistic manner by a method that includes both a physical model and phenomenological approximations.

In stage 28 the steering angle α of the wheel 3 and the vertical suspension deflection z of the wheel 3 relative to the body 5 are measured, in order to be taken into account in the function FTD. The vertical suspension deflection z is the vertical distance of a predetermined point on the body 5 relative to the point of contact of the wheel 3 with the ground.

For example, as regards the physical modelling of the connection means, the joint 12 is likened to a frictionless pivot about which the wishbone 6 pivots and the joint 13 is likened to an elastic spring of stiffness K mounted in parallel with a damper that produces a damping force proportional to the relative displacement speed of the mountings of the joint 13, with a damping coefficient C. As a function of the longitudinal displacement d(t) of the wheel 3 along the axis X, the virtual driving force FAMX is obtained by solving a system of differential equations of the form:

$$\{FAMX(t) = G[Kd(t) + Cd'(t)],$$

$$\{FMx(t) = M d''(t) + Cd'(t)] + Kd(t)$$

in which M denotes the unsuspended mass associated with the wheel 3, i.e. the mass of the assembly consisting essentially of the wheel 3, the hub support 4, the suspension wishbone 6 and the lower part 7b of the force strut 7, d'(t) denotes the time derivative of the function d(t), and G denotes a phenomenological weighting coefficient.

The coefficient G interprets phenomena that are not explicitly modelled in the above equation system, i.e. the participation of the track rod 8 and the force strut 7 in the transmission of force, friction at the level of the joints, for example in the swivel joint between the hub support 4 and the wishbone 6, the non-linearity of the elastic bodies in joint 12 and 13, and others.

One could make do by solving the above equation system analytically within the frequency range. However, that method would not give a precise enough result. Stage 25 is in fact implemented with the aid of a first neuronal network 26 which gives a representation of the function FTD which is much more precise than can be obtained by linear analytical modelling. The inputs to the neuronal network 26 are the values of the force FMx, the steering angle α and the vertical deflection z of the wheel 3. It will be described in detail later on.

The steering angle α is measured by a steering angle measurement detector 24 which cooperates with the steering column 9 of the vehicle 1. The vertical deflection z is measured by a detector 27 which measures the relative displacement between the parts 7a and 7b of the force strut 7, relative to a predefined reference position.

In stage 29 the actual force FAX transmitted to the body 5 by the joint 12 in the longitudinal direction X of the vehicle 1 is measured. Various known measurement methods can be used to measure the actual force FAX.

In stage 31 a force FADX is calculated, which is the result of the difference between the actual force FAX measured in stage 29 and the virtual driving force FAMX calculated in stage 25:

$$FAD = FAX - FAMX$$

The force FADX corresponds to the difference between the virtual driving force FAMX and the actual force FAX which is effectively transmitted to the body. Thus, the force FADX corresponds to the effect, at the level of the joint 12, of a virtual resistance force FDx exerted on the wheel 3 under the action, inter alia, of the braking system when it is actuated and the rolling resistance in the contact area between the wheel 3 and the ground.

The forces FADX and FAMX are virtual in the sense that they cannot be measured separately in the general case, but only their sum FAX can be measured. Of course, there are simple particular situations in which the force FADX or FAMX becomes zero. For example, if the engine is uncoupled from the wheel 3, for example by disengaging the clutch, the virtual driving force FAMX becomes zero.

In stage 33 the virtual resistance force FDx is calculated from the force FADX as the result of transmitting the force FADX from the connection point A on the body 5 to the wheel 3 via the joint 12, the suspension wishbone 6 and the hub support 4. The force FDx calculated is orientated in the longitudinal direction x of the wheel 3. The calculation is performed with the aid of a second function FTI which represents the dynamical properties of the connection means connecting the body 5 to the wheel 3. Similarly to stage 25, the function FTI is modelled by a method that includes both a physical model and phenomenological approximations.

However, the function FTI cannot be deduced by inverting the function FTD, because the virtual driving force FMx and the virtual resistance force FDx produce different effects. This is because for the mechanical system consisting of the unsuspended mass associated with the wheel 3, the drive torque Γ can be likened to an external force applied at the centre of the wheel 3, whereas the dissipative or braking forces include both internal forces and forces applied in the contact area between the wheel 3 and the ground. Thus, the function FTI must be modelled independently of the function FTD.

In stage 34 the steering angle α of the wheel 3 and the vertical deflection z of the wheel relative to the body 5 are measured, so that they can be taken into account in the function FTI. Stage 34 is not necessarily distinct from stage 28.

Stage 33 is preferably implemented with the aid of another neuronal network 35, which gives a realistic and precise representation of the function FTI. The neuronal network 35 receives as inputs the values of the force FADX, the steering angle α and the vertical deflection z of the wheel 3. It will be described in more detail later.

In stage 36 the force Fx is calculated as the sum of the virtual driving force FMx from stage 22 and the virtual resistance force FDx from stage 33:

$$Fx=FMx+FDx.$$

Stage 36 is implemented by a summation module 37, one of whose outputs is connected to an output interface 38 of the device 40 to make the value of the force Fx available for an on-board ABS or ESP assistance system (not shown). For example, the device 40 communicates with such an assistance system via an internal data transport network 39 of the vehicle 1.

FIG. 3 shows schematically the forces FMx, FAMX, FADX and FDx taken into account for determining the force Fx. The value obtained for Fx is a very precise estimate of the longitudinal force transmitted to the wheel at the level of its ground contact area. This estimate is obtained in real time with the aid of the electronic device 40, stages 20 to 36 being implemented by timed sampling during the operation and circulation of the vehicle. For example, the measurement signals are sampled at a frequency of 200 Hz.

The functional modules 23, 32 and 37 of the device 40 can be made in the form of an assembly of electronic components whose material design is specific to the purpose, or in the form of a generic assembly of electronic components, for example a generic microprocessor card programmed by a purpose-specific computer program, or as a combination of the two. In terms of the invention a computer program is a group of instruction codes that can be read from or written to a support and executed by a computer or similar equipment.

In FIG. 6 the connections between the various modules have been indexed with the names of the parameters transmitted by those connections.

An example embodiment of the neuronal networks 25 and 35 of the device 40 will now be described with reference to FIGS. 7 and 8. In this example the inputs representing the values of the steering angle α and the vertical deflection z are not included.

The neuronal networks 26 and 35 are looped multi-layered networks of conditions, each having a respective input layer 26a, 35a, a respective single hidden layer 26b, 35b, and a respective output layer 26c, 35c.

Figure 7:
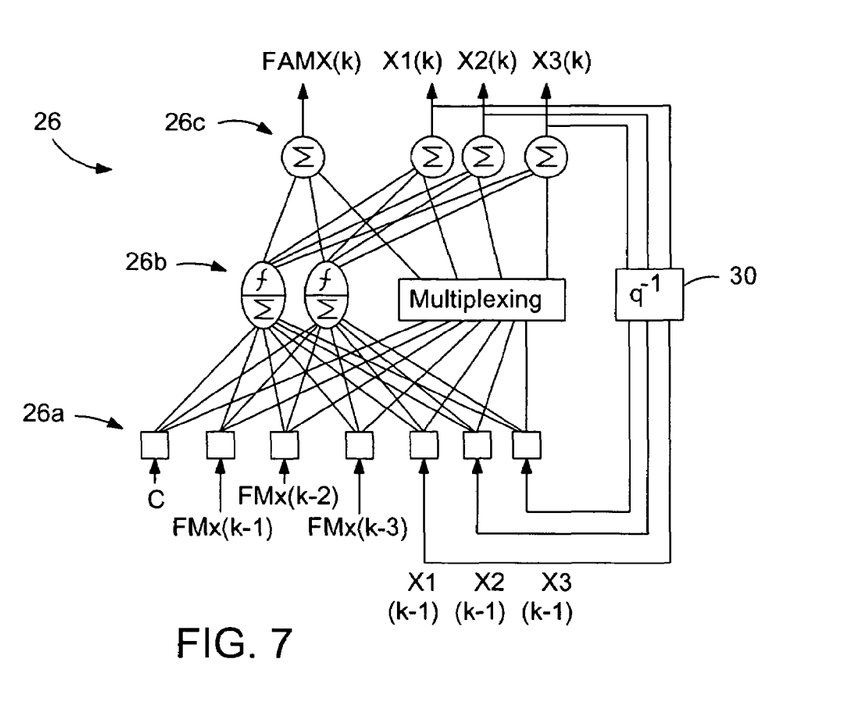
FIGS. 7 and 8: Two neuronal networks of the device of FIG. 6.

In the network 26 represented in FIG. 7, the input layer 26a has three neurones which receive respectively an input signal representing the value of the force FMx during the last three time increments indexed k-1, k-2 and k-3, k being the current index of the moment at which the virtual force FAMX is calculated. Thus, the network 26 has a memory of order 3 for inputs. The input layer 26a also has three neurones which receive, respectively, an input signal corresponding to the value of three condition variables X1, X2 and X3 obtained at the previous time increment k-1 from a memory 30. Finally, the input layer 26a has a neurone which receives a constant input signal c.

The hidden layer 26b consists of two sigmoid neurones actuated linearly with bias, and a multiplexing unit. Each of these elements is connected to each of the seven neurones of the input layer 26a.

The output layer 26c consists of a linear neurone with bias, which delivers an output signal FAMX(k) representing a current value of the virtual force FAMX calculated at the time increment indexed k, an output signal X1(k) X1(k) X3(k) representing a current value, calculated at the time increment indexed k, of the three condition variables X1, X2 and X3 respectively.

Figure 8:
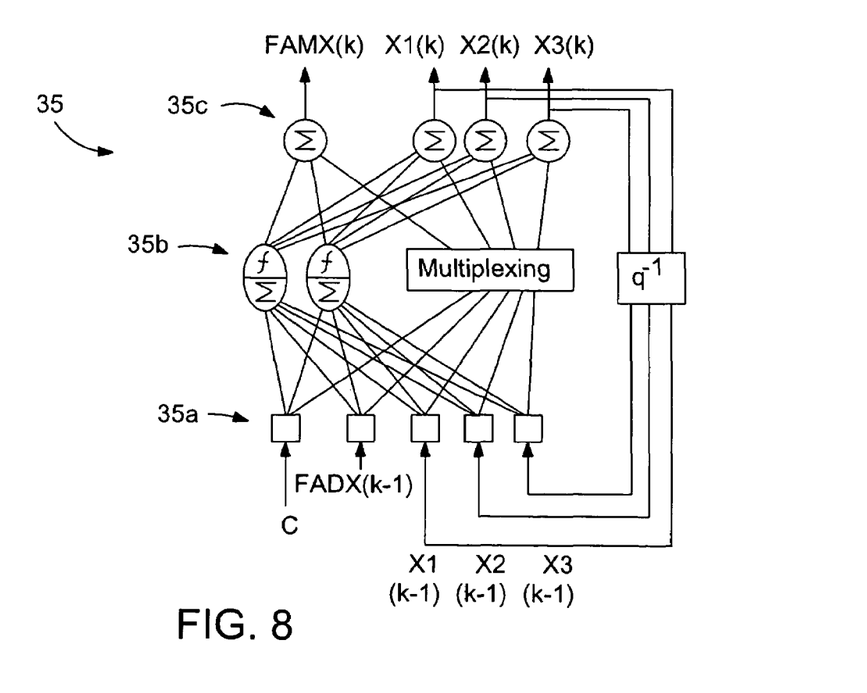

The structure of the network 35 represented in FIG. 8 is essentially identical to that of the network 26, except for the input layer 25a which comprises a neurone that receives an input signal FADX(k-1) which represents a value of the virtual force FADX calculated at the time increment (k-1), in place of the three corresponding neurones of the network 26. Thus, the network 35 has a memory of order 1 for inputs. The output layer 35c has a linear neurone with bias which delivers an output signal FDx(k) representing a current value of the virtual force FDx, in place of the corresponding neurone of the network 26.

The input and output signals are sampled at a frequency of 200 Hz. The two networks 26 and 35 are of order 3 for conditions, i.e. they each have three condition variables X1, X2 and X3 which are independent of the condition variables of the other network.

For each of the networks 26 and 35, the coefficients of the neurones that allow tracking of the functions FTD and FTI respectively are obtained at the conclusion of a teach-in stage. The values of the coefficients are fixed at the conclusion of this teach-in stage, which takes place before the device 40 is brought into service.

The first embodiment described above enables the determination of the longitudinal force exerted on the wheel 3 in very many situations, including complex driving situations in which a significant driving force and a significant resistance force are applied simultaneously to the wheel 3.

A second embodiment of the method and device for force determination will now be described, this being simpler than the first embodiment and suitable for determining the longitudinal force exerted on the wheel 3 in simple driving situations, namely when either the driving force or the braking force is zero or at least negligible.

As mentioned earlier, when the driving force resulting from the drive torque Γ is zero or negligible compared with the resistance force, in particular compared with the force applied by the vehicle's braking system, the algorithm represented in FIG. 4 can be simplified by omitting stage 31. In this case, as indicated by the arrows 131a and 131b, the longitudinal force Fx is obtained directly by applying the transfer function FTI to the measured force FAX, which then corresponds to a body-associated resistance force.

Reciprocally, when the resistance force applied by the braking system is zero or negligible, the algorithm represented in FIG. 4 can be simplified by omitting stages 22, 31 and 33. In that case, as indicated by the arrows 141 and 142, the longitudinal force Fx is obtained directly from the measured force FAX and from a transfer function applied in stage 125.

In stage 125 a transfer function is used, which models the transmission of the measured force FAX, which then corresponds to a body-associated driving force, from the connection point A to the wheel 3 via the connection means that connect the wheel 3 to the body 5. Mathematically, this function is the inverse of the function FTD used in the first embodiment. As indicated by the arrow 143, the inverse transfer function can advantageously be calculated as a function of the drive torque Γ.

To determine whether one is in the first or second of the above simple situations, a logic indicator of the braking system activity can be used, for example an indicator showing that the rear braking lights are on or an indicator of appreciable brake pedal displacement along its course.

Starting from the hypothesis that the driver will generally not be accelerating significantly when he actuates the braking system, it is chosen to carry out stages 131a, 33 and 131b when the braking system is active and stages 141, 125 and 142 when the braking system is inactive.

An on-board electronic device 140 for implementing this simplified algorithm is represented in FIG. 6, in which, in the second embodiment, the components 23, 32 and 37 are omitted and elements represented by broken lines are added.

The measurement system 114 receives as an input a logic variable L which indicates whether the braking system of the wheel 3 is active or inactive. The measurement system 114 has two signal outputs 132a and 132b connected respectively to the neuronal network 35, and to a neuronal network 126 which is programmed to apply the transfer function which is the inverse of the function FTD, taking the drive torque Γ into account. The measurement system 114 has an output commutator (not shown), which switches as a function of the variable L to select the output 132a when the braking system is active, in which case the value of the force Fx is transmitted to the output interface 38 by the connection 114, and to select the output 132b when the braking system is inactive, in which case the value of the force Fx is transmitted to the output interface 38 by the connection 145.

The method and device described above have been validated by comparison with direct measurements, and provide an estimate of the longitudinal force Fx with a mean-square error smaller than 2%.

Although the embodiments described above concern a driving wheel of a traction vehicle, the method and device are also suitable for a driving wheel of a propulsion vehicle. A vehicle can also be equipped with more than one device 40 or 140 so as to determine the forces received by each of its driving wheels. Moreover, the method and device can be adapted for a driven (non-driving) wheel, in which case the stages and components corresponding to the acquisition and treatment of driving forces can be omitted.

Although the invention has been described in connection with a number of particular embodiments, it is clearly not limited to these and covers all the technical equivalents of the means described and their combinations insofar as they lie within the scope of the invention.

What is claimed is:

1. A method for determining a longitudinal force (Fx) exerted on a wheel of a motor vehicle by a ground surface supporting the wheel, the vehicle comprising connection means which connect the wheel to a body of the vehicle, the method comprising:
    measuring an actual force (FAX) at a level of at least one measurement point in the connection means,
    calculating a force (FDx, Fx) resulting from a transmission via the connection means from the at least one measurement point to the wheel, of a body-associated force (FADX, FAX), which depends at least on the actual force,
    calculating the longitudinal force (Fx) exerted on the wheel by the ground surface as a function at least of the force (FDx; Fx) resulting from the transmission of the body-associated force.

2. The method according to claim 1, wherein the force (FDx; Fx) resulting from the transmission of the body-associated force is calculated as a function of at least one parameter chosen from among: a steering angle (α) of the wheel, a vertical distance (z) of the wheel relative to the body, an activity condition of a braking system coupled to the wheel, and a drive torque (Γ) applied to the wheel by an engine of the vehicle.

3. The method according to claim 2, further comprising:
    measuring the steering angle (α) of the wheel, and
    calculating the force (FDx; Fx) resulting from transmission of the body-associated force as a function of the steering angle.

4. The method according claim 2, further comprising:
    measuring the vertical distance (z) of the wheel relative to the body is measured, and
    calculating the force (FDx; Fx) resulting from transmission of the body-associated force as a function of the vertical distance.

5. The method according to claim 2, further comprising:
    detecting the activity condition (L) of the braking system coupled to the wheel, and
    calculating the force (FDx; Fx) resulting from transmission of the body-associated force as a function of the detected activity condition.

6. The method according to any of claims 1 to 5, wherein the force (FDx; Fx) resulting from the transmission of the body-associated force is calculated by applying to the body-associated force (FADX; FAX) a transfer function representative of the connection means.

7. The method according to claim 6, wherein the transfer function is applied by means of at least one neuronal network.

8. The method according to claim 2, wherein the wheel is a driving wheel and the method further comprises:

measuring the drive torque (Γ) applied to the wheel by the engine of the vehicle, and calculating the force (FDx; Fx) resulting from transmission of the body-associated force as a function of the drive torque (Γ).

9. The method according to any of claims 1 to 5, wherein the body-associated force consists of the actual force (FAX).

10. The method according to claim 8, further comprising calculating a virtual, wheel-associated driving force (FMx), which represents a reaction of the ground surface to the drive torque, wherein:

the body-associated force (FADX) depends on the virtual wheel-associated driving force (FMx), the force resulting from transmission of the body-associated force is calculated as a virtual, wheel-associated resistance force (FDx), and the longitudinal force (Fx) exerted on the wheel by the ground surface is calculated as a function of the virtual, wheel-associated driving force (FMx) and of the virtual, wheel-associated resistance force (FDx).

11. The method according to claim 10, wherein the calculation of the body-associated force (FADX) comprises:

calculating a virtual, body-associated driving force (FAMX), which would result from a transmission of the virtual, wheel-associated driving force (FMx) from the wheel to the at least one measurement point via the connection means, and calculating the body-associated force as a virtual, body-associated resistance force (FADX), as a function of the actual force (FAX) and of the virtual, body-associated driving force (FAMX), the virtual, body-associated resistance force being applied at the level of the at least one measuring point.

12. The method according to any of claims 1 to 5, wherein the at least one measuring point comprises a connection point between the connection means and the body, and the actual force (FAX) measured is a force exerted on the body at the level of the connection point.

13. The method according to claim 12, wherein the connection means comprises a hub support on which the wheel is mounted, a suspension wishbone or arm connected to the hub support, and at least one elastic joint comprising two mountings connected by an elastic body, a first of the mountings being fixed to the suspension wishbone, and a second of the mountings being fixed to the body and constituting the at least one connection point to the body.

14. The method according to claim 13, wherein the actual force (FAX) is measured by determining a deformation of the elastic body.

15. The method according to any of claims 1 to 5, wherein the actual force (FAX) is measured parallel to a longitudinal direction of the vehicle.

16. A device for determining a longitudinal force (Fx) exerted on a wheel of a motor vehicle by a ground surface supporting the wheel, the vehicle comprising connection means that connect the wheel to a body of the vehicle, the device comprising:

means for measuring an actual force (FAX) at a level of at least one measurement point in the connection means, means for calculating a force (FDx; Fx) that results from a transmission via the connection means, from the at least one measurement point to the wheel, of a body-associated force (FADX; FAX) that depends at least on the actual force (FAX), and means for calculating the longitudinal force (Fx) exerted on the wheel by the ground surface as a function at least of the force (FDx; Fx) resulting from the transmission of the body-associated force.

17. The device according to claim 16, further comprising means for measuring a steering angle (α) of the wheel, wherein the force (FDx; Fx) resulting from the transmission of the body-associated force is calculated as a function of the steering angle.

18. The device according to claim 16, further comprising means for measuring a vertical distance (z) of the wheel relative to the body, wherein the force (FDx; Fx) resulting from the transmission of the body-associated force is calculated as a function of the vertical distance.

19. The device according to claim 16, further comprising means for detecting an activity condition (L) of a braking system coupled to the wheel, wherein the force (FDx; Fx) resulting from the transmission of the body-associated force is calculated as a function of the activity condition.

20. The device according to claim 16, further comprising means for measuring a drive torque (Γ) applied to the wheel by an engine of the vehicle, wherein the force (FDx; Fx) resulting from transmission is calculated as a function of the drive torque (Γ).

21. The device according to claim 20, further comprising:

means for calculating a virtual, wheel-associated driving force (FMx) that represents a reaction of the ground surface to the driving torque (Γ), means for calculating a virtual, body-associated driving force (FAMX) that would result from transmission of the virtual wheel-associated driving force (FMx) from the wheel to the at least one measurement point via the connection means, means for calculating the body-associated force as a virtual, body-associated resistance force (FADX), as a function of the actual force (FAX) and of the virtual, body-associated driving force (FAMX), the virtual, body-associated resistance force (FADX) being applied at the level of the at least one measurement point, wherein the force resulting from transmission of the body-associated force is calculated as a virtual, wheel-associated resistance force (FDx), and the longitudinal force (Fx) exerted on the wheel by the ground surface is calculated as a function of the virtual, wheel-associated driving force (FMx) and of the virtual, wheel-associated resistance force (FDx).

* * * * *

UNITED STATES PATENT AND TRADEMARK OFFICE
CERTIFICATE OF CORRECTION

PATENT NO. : 7,055,917 B2
APPLICATION NO. : 11/045945
DATED : June 6, 2006
INVENTOR(S) : Xavier Huchard et al.

It is certified that error appears in the above-identified patent and that said Letters Patent is hereby corrected as shown below:

On The Title Page, Item
[75] INVENTORS

"Xavier Huchard, Domicile (FR);" should read --Xavier Huchard, Pout-du-Chateau (FR);--; and "Jean-Yves Lenoir, Domicile (FR)" should read --Jean-Yves Lenoir, Clermont-Ferrand (FR)--.

COLUMN 3

Line 63, "body. for example," should read --body, for example,--.

COLUMN 5

Line 56, "at last one" should read --at least one--.

COLUMN 6

Line 21, "invention" should read --invention;--.
Line 23, "device" should read --device;--.
Line 25, "FIG. 4" should read --FIG. 4;--.
Line 27, "FIG. 1" should read --FIG 1;--.
Line 30, "wheel" should read --wheel;--.
Line 33, "FIG. 1" should read --FIG. 1; and--.
Line 52, "on another" should read --one another--.
Line 55, "torque F" should read --torque Γ--.

COLUMN 8

Line 63, "FAD=FAX-FAMX" should read --FADX=FAX-FAMX--.

COLUMN 9

Line 2, "inter alia," should read --*inter alia*,--.

UNITED STATES PATENT AND TRADEMARK OFFICE
CERTIFICATE OF CORRECTION

PATENT NO. : 7,055,917 B2
APPLICATION NO. : 11/045945
DATED : June 6, 2006
INVENTOR(S) : Xavier Huchard et al.

It is certified that error appears in the above-identified patent and that said Letters Patent is hereby corrected as shown below:

COLUMN 10

Line 40, "X1(k) X1(k)" should read --X1(k) X2(k)--.

Signed and Sealed this

Twentieth Day of November, 2007

JON W. DUDAS
*Director of the United States Patent and Trademark Office*